Patented Dec. 14, 1926.

1,611,139

UNITED STATES PATENT OFFICE.

LOUIS BARTELSTONE, OF FLATBUSH, NEW YORK.

METHOD OF MAKING LAMINATED GLASS.

No Drawing. Application filed July 30, 1924, Serial No. 729,069. Renewed July 30, 1926.

This invention relates to the art of making laminated glass and it is based upon a discovery that, through a certain procedure, a greater adhesion may be secured and a more uniform attachment of the parts may be obtained.

Heretofore, through various methods, a product known as "laminated glass" has been made; such product possessing many well-known advantages over ordinary glass in respect to the fact that, even if fractured, the laminated glass will not fall apart and pieces of any material size will not be thrown off. Such a product has been made by cementing together two outer plates of glass with an intervening sheet of celluloid or other non-brittle substance.

The primary difficulty encountered in manufacturing such a product has been that it is by no means easy to secure a perfect adhesion of the glass to the celluloid.

Various methods aiming at this result have been proposed and several have been put into practice but, heretofore, none has been entirely satisfactory. In some cases, the adhesion while very positive is more or less local so as to leave certain regions in which the adhesion is poor or in which there is no adhesion at all and in which even a film of air may be detected. In other cases, the cementing elements are not sufficiently permanent i. e. they manifest a tendency to yield to atmospheric conditions in the course of time or, through other action not well understood, to suffer a reduction of the co-efficient of tenacity.

The methods heretofore deemed most suitable have been based on the principle of employing an agent (in the nature of a solvent for celluloid) and using this agent for the purpose of rendering the surface of a sheet of celluloid or like material more or less tacky and then pressing the glass against the tacky surface of the celluloid to secure an intimate contact, and finally subjecting the product to a prolonged heating with the object of expelling all residual solvent. It has been found, however, that the solvent is really never entirely eliminated and can be detected by the odor of a broken piece of the laminated glass even after a long period. Furthermore, the solvent has a perceptible tendency towards impairing the intrinsic strength of the celluloid and also, as has been above mentioned, the tendency is for certain regions not to be adequately cemented.

This invention is predicated upon the discovery that a non-solvent may be employed to great advantage and that thereby results superior to anything heretofore attained can be realized. For example, a vegetable oil devoid of solvent properties towards celluloid or other substitutes for celluloid, has been found capable of making a union superior to that heretofore possible. Castor-oil, for instance, is a vegetable product which is recognized as possessing no appreciable capacity for acting as a solvent for celluloid or any of the equivalent cellulose products.

Notwithstanding its seemingly inert qualities, when a sheet of celluloid is coated with a film of castor-oil, and then pressed firmly against the clean surface of a sheet of glass under considerable pressure, the film of castor-oil will apparently be entirely squeezed out and an exceedingly tenacious adhesion will be found to exist between the celluloid and the glass; especially after some heating.

In carrying out this process, the glass will preferably first be coated with a microscopic film of celluloid by applying to the glass a liquid solution of celluloid and allowing the same to dry on the glass very thoroughly until all of the residual solvent has evaporated into the air. This takes place thoroughly and expeditiously inasmuch as the film is exposed at all points directly to the air and there is nothing hindering its drying out thoroughly. The comparatively thick sheet of celluloid which it is desired to "sandwich" between two pieces of glass is merely coated with a thin film of castor-oil on both sides and the plates of glass (prepared as aforesaid) are then brought against the opposite surfaces of the sheet of celluloid and pressure is applied and maintained at an elevated temperature (such as that of a steam-table) and this condition of temperature and pressure is continued for a few minutes; whereupon it will be found that the parts are most tenaciously secured together and that they cannot be separated by any known means without either breaking or splitting the glass, especially if it be in plates of substantial size.

It has been discovered that castor-oil operates so effectively in thus cementing glass and celluloid together that pressures and temperatures within considerable ranges may be resorted to with extremely efficient results for example, a temperature of from 228 degrees F. to 240 degrees F. under a pressure ranging from 100 pounds per square inch to 400 pounds per square inch will produce a distinctly superior adhesion; the time interval being from say five minutes to twenty minutes. It is believed that the best results can ordinarily be attained by employing a temperature of 230 degrees F. at a pressure of 150 pounds per square inch for the period of about eight minutes.

In carrying out this process, especially with glass plates of considerable area, a refinement of great importance consists in the manner of applying the pressure. That is to say, the pressure should not be so applied as to seal marginal portions of the laminated glass before the castor-oil has been completely expelled from central regions. Otherwise, the adhesion of the central regions would not attain the highest degree of tenacity. Therefore, this process contemplates the application of the pressure in such a manner that it becomes effective in the first instance on the central region of the laminated glass and progressively increases in magnitude from that inner portion outwardly so as progressively to squeeze every excess of the cementing material outwardly away from the central region until ultimately it is all expelled at the marginal portions before the ultimate pressure is applied to such marginal portions to produce the final permanent adhesion thereof. This progressive increase in the pressure until the entire product is subjected uniformly to the ultimate pressure may, of course, be accomplished by various structural characteristics of the press and these structural characteristics relate to mechanical matters and form no part of this process but are subject to independent applications for structural patents.

In lieu of celluloid, sheets of cellulose acetate may be employed as the intervening non-shatterable foundation for the plates of glass. This acetate film may be affixed to the glass in precisely the same manner disclosed with respect to the celluloid and the glass may be initially prepared by simply cleansing or by a preliminary varnish of a solution of celluloid; it being found that a superior adhesion can be obtained in either instance and the resultant product will be found to possess an extremely high degree of clearness inasmuch as cellulose acetate can be obtained which will to no perceptible extent tend to exhibit an off-color tint as a result of prolonged exposure to sunlight.

It is contemplated that other elements equivalent to castor-oil may be employed. For example, another oil of vegetable origin lacking in solvent properties towards celluloid or cellulose acetate is raw linseed oil and experiments have confirmed that this material may also be employed as above indicated for producing a very efficacious adhesion. Other analogous oils, which chemists will recognize as equivalent for castor-oil and linseed oil, are likewise contemplated.

This product is exceedingly advantageous by reason of the permanency of the union. Heretofore, laminated glass as made by approved methods has required a supplemental auxiliary sealing of the marginal portions to prevent the atmosphere from progressively deteriorating the intervening material but, in the case of a product made by the present process, the union is so complete and the material so immune to atmospheric conditions that no sealing whatsoever is to any extent necessary. It will be found that this product will withstand very severe impacts without being pierced or broken apart and without shedding pieces of glass of material size even though the blow should cause the glass to be cracked in a very pronounced manner. The product is, in consequence, very suitable for windshields of automobiles, port-windows of vessels, and eyeglasses for masks and goggle by reason of being a very superior safety element.

Having thus revealed this invention, I claim as new and desire to secure the following combinations and elements, or equivalents thereof, by Letters Patent of the United States:

1. The art of making laminated glass which consists in applying to the surface of a flexible film a coating of vegetable oil devoid of solvent properties towards the material of said film; and then affixing said film to glass by applying a pressure adequate to squeeze out all appreciable excess of said oil and maintaining said pressure at an elevated temperature for a short time.

2. A laminated-glass-making process comprehending the use of a non-solvent vegetable oil as an initial cementing agent; and eliminating all perceptible excess thereof by subjecting the laminated product to a high pressure for a sufficient interval of time to permit all of said excess to be squeezed out.

3. A method of cementing celluloid or cellulose acetate film to glass which consists in initially coating the film with a thin layer of castor-oil; then applying same to a surface of glass; then subjecting the same through a pressure progressively increasing from the central region outwardly for a sufficient interval of time to expel every appreciable amount of cementing agent; then maintaining the pressure at an elevated temperature for a sufficient interval of time to permit the union to become permanent.

4. The mode of producing laminated glass which comprises the initial step of thinly coating the glass with a solution of celluloid; then thoroughly drying the exposed coating to eliminate all traces of the solvent; then coating a flexible sheet of celluloid or cellulose acetate with a thin layer of a non-solvent oil; then pressing the glass plates and the intervening film together for a sufficient interval of time to expel all of said oil; and heating the laminated material until the adhesion has become permanent.

5. The art of laminating glass and celluloid which consists in applying a preparatory film of a solution containing a cellulose base to each surface to be cemented together; then drying said preparatory films; then coating the surfaces thus prepared with a vegetable oil; and then squeezing the laminæ together under heat and pressure.

6. The art of laminating glass and celluloid which consists in applying a preparatory film of a solution containing a cellulose base to each glass surface to be cemented together; then drying said preparatory films; then coating the surfaces thus prepared with a vegetable oil; and then squeezing the laminæ together under heat and pressure.

7. The art of laminating glass and celluloid which consists in applying a preparatory film of a solution containing a cellulose base to each celluloid surface to be cemented together; then drying said preparatory films; then coating the surfaces thus prepared with a vegetable oil; and then squeezing the laminæ together under heat and pressure.

8. The art of laminating glass and celluloid which consists in applying a preparatory film of a solution containing a cellulose base to each glass and celluloid surface to be cemented together; then drying said preparatory films; then coating the surfaces thus prepared with a vegetable oil; and then squeezing the laminæ together under heat and pressure.

9. The art of laminating glass and cellulose-acetate which consists in applying a preparatory film of a solution containing a cellulose base to each surface to be cemented together; then drying said preparatory films; then coating the surfaces thus prepared with a vegetable oil; and then squeezing the laminæ together under heat and pressure.

10. The art of laminating glass and cellulose-acetate which consists in applying a preparatory film of a solution containing a cellulose base to each glass surface to be cemented together; then drying said preparatory films; then coating the surfaces thus prepared with a vegetable oil; and then squeezing the laminæ together under heat and pressure.

11. The art of laminating glass and cellulose-acetate which consists in applying a preparatory film of a solution containing a cellulose base to each celluloid surface to be cemented together; then drying said preparatory films; then coating the surfaces thus prepared with a vegetable oil; and then squeezing the laminæ together under heat and pressure.

12. The art of laminating glass and cellulose-acetate which consists in applying a preparatory film of a solution containing a cellulose base to each glass and celluloid surface to be cemented together; then drying said preparatory films; then coating the surfaces thus prepared with a vegetable oil; and then squeezing the laminæ together under heat and pressure.

13. The art of laminating glass and cellulose-acetate which consists in applying a preparatory film of a solution containing a cellulose base to each surface to be cemented together; then drying said preparatory films; then coating the surfaces thus prepared with a vegetable oil; and then squeezing the laminæ together under heat and pressure.

In witness whereof, I hereunto subscribe my name.

LOUIS BARTELSTONE.